US005751001A

United States Patent [19]
Verbeke

[11] Patent Number: 5,751,001
[45] Date of Patent: May 12, 1998

[54] CASSETTE FOR PHOTO-STIMULABLE RADIOGRAPHY

[75] Inventor: Gentil Verbeke, Edegem, Belgium

[73] Assignee: Agfa-Gevaert, Mortsel, Belgium

[21] Appl. No.: 827,640

[22] Filed: Apr. 10, 1997

Related U.S. Application Data

[60] Provisional application No. 60/019,507 Jun. 4, 1996.

[30] Foreign Application Priority Data

Apr. 22, 1996 [EP] European Pat. Off. ............. 96201073

[51] Int. Cl.⁶ .................................................. G03B 42/04
[52] U.S. Cl. .................................................. 250/484.4
[58] Field of Search .......................... 250/484.4, 486.1, 250/580, 581; 378/182, 185

[56] References Cited

U.S. PATENT DOCUMENTS 4,975,590  12/1990  Tanaka ................................. 250/484.4
5,519,229  5/1996  Verbeke et al. ...................... 250/484.4

FOREIGN PATENT DOCUMENTS

0522317 A1  1/1993  European Pat. Off. ............ 250/284.4

*Primary Examiner*—Edward J. Glick
*Assistant Examiner*—Darren M. Jiron
*Attorney, Agent, or Firm*—Baker & Botts, L.L.P.

[57] ABSTRACT

A cassette (10) for photo-stimulable ("PSL") radiography, comprising a flat rigid base (12) and a cap (14) for the base which is releasably securable thereto so as lighttightly to cover a layer of PSL material applied to the inside face of the base, which cassette comprises a rigid removable PSL plate (13) which can freely rest on the base plate within the cap, and which is arranged for absorbing a portion of the X-ray radiation image which will expose the PSL layer on the base and which has four extensions (17) for its lifting, the cap (14) and the removable PSL plate (13) being arranged in such a way that both the cap alone, and the cap together with the PSL plate can be lifted from the base, in order to allow the separate reading-out of the image of the base and of the PSL plate.

11 Claims, 6 Drawing Sheets

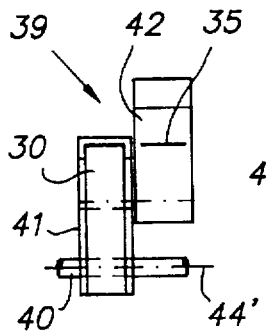
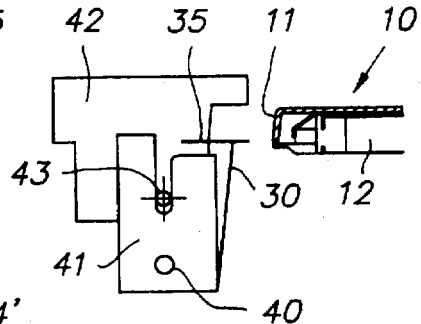
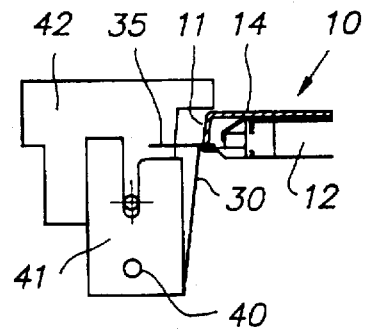
FIG. 3a     FIG. 3b     FIG. 3c
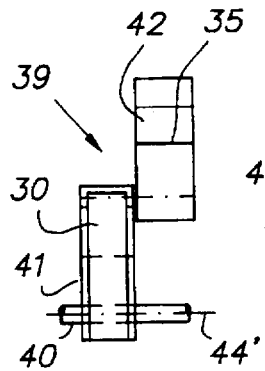
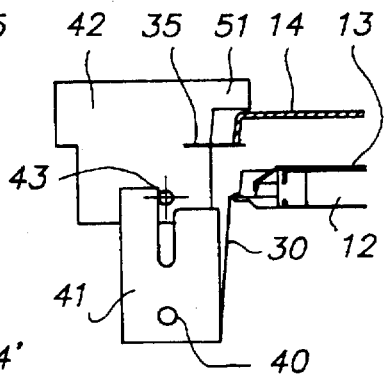
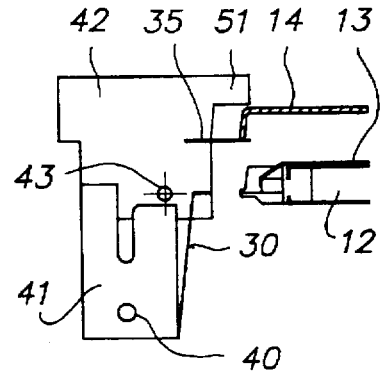
FIG. 5a     FIG. 5b     FIG. 5c
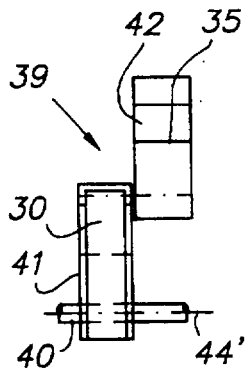
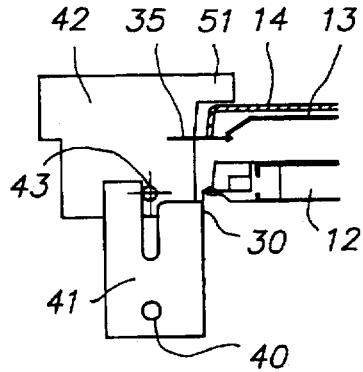
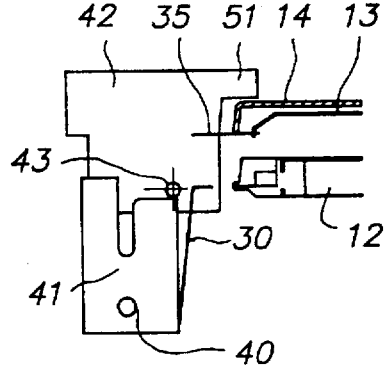
FIG. 7a     FIG. 7b     FIG. 7c

CASSETTE FOR PHOTO-STIMULABLE RADIOGRAPHY

This application claims the benefit of U.S. Provisional Application No. 60/019,507 filed Jun. 4, 1996.

BACKGROUND OF THE INVENTION

1. Field of the Invention

The present invention relates to a cassette for photo-stimulable radiography, allowing a plurality (at least two) PSL images to be recorded simultaneously, and to be read out separately.

2. Description of the Prior Art

In photo-stimulable ("PSL") radiography, a stimulable phosphor is first image-wise exposed to radiation passing through an object like a human body to record a latent radiation image therein and the stimulable phosphor is then exposed to stimulating rays to emit light representing the recorded radiation image. This light is detected and the detected signal is used for displaying the image or for finally recording a visible image on another recording material.

Radiographic images are used for the purpose of diagnosis, inspection of internal structure of various materials and so forth. When using the radiographic system, it is required to detect very minute differences in X-ray absorption of an object. The ability of detecting minute differences in X-ray absorption is represented by the contrast detecting power of the radiographic image recording system. The higher is the contrast detecting power, the higher is the diagnostic efficiency and accuracy or the inspection efficiency and accordingly the higher is the value of the image in the practical sense. Therefore, in order to enhance the diagnostic efficiency, it is desired that the contrast detecting power of the radiographic image be improved. In the practical use, however, it is difficult to simply improve the contrast of the radiographic image because of the noise of various kinds involved therein.

A method is known for processing the radiographic image obtained by a radiographic image recording system using a stimulable phosphor in which the noise involved in the radiographic image is effectively reduced and the contrast detecting power of the image is markedly improved, which comprises recording radiographic images of an object viewed from the same direction on a plurality of stimulable phosphor plates, and superposing the plurality of image signals obtained by reading out the radiographic images recorded in the stimulable phosphor plates.

The enhancement of the contrast is conducted by a gradation processing which enhances the contrast of the whole image or only of particular frequency components of the image.

This method is disclosed for instance in U.S. Pat. No. 4,356,398. The recording of several images of an object on a plurality of stimulable phosphor plates can either occur at once or sequentially. The present invention is concerned with the recording in one cassette of such images.

SUMMARY OF THE INVENTION

Object of the Invention

It is the object of the present invention to provide a cassette for PSL radiography which allows the ready reading-out of different radiographic images recorded in different layers of PSL material in such cassette, so that a method as described hereinabove can be carried out in a convenient way.

Statement of Invention

In accordance with the present invention, a cassette for photo-stimulable ("PSL") radiography, comprising a flat rigid base and a cap for the base which is releasably securable thereto so as to lighttightly cover a layer of PSL material applied to the inside face of the base, is characterised in that said cassette comprises at least one rigid removable PSL plate which can freely rest on said base plate within said cap, said at least one PSL plate being arranged for absorbing a portion of the X-ray radiation image which will expose the PSL layer on the base, said cap and said removable PSL plate being arranged in such a way that both the cap alone, and the cap together with said PSL plate can be lifted from the base in order to allow the separate reading-out of the images of the base and of the removable PSL plate(s).

The order of reading out the distinct images is not unimportant since reading out first the image of the base allows the image(s) of the removable PSL plate(s) to remain within the removed cap of the cassette whereby it is protected against occasional stray light from the erasing light which is used to erase the image of the base after its reading-out. In this and in all further places in the description the image of the base or of a removable PSL plate means the image produced in a layer of PSL material present on said base and said plate, either directly or indirectly via an intermediate support such as a foil coated with PSL material which is adhered to such base or such plates.

The removable PSL plate(s) must have X-ray absorption characteristics which are non-negligible so that it can, at least to some extent, alter the distribution of the energy spectrum of the X-ray source used for the exposure. This has for consequence that the image produced by radiation transmitted through the plate differs from the image formed on top of the plate. By subtractive manipulation of the electric image signals of both images the perceptibility may be substantially improved. Suitable construction materials for the PSL plate(s) are copper, berylium copper, alloys thereof, etc.

Suitable thickness ranges for such plate(s) are between 0.5 and 1.5 mm but these limits are not strict and depend on the absorbing power of the plate(s).

Suitable embodiments of the invention are as follows.

The cap has a peripheral flange surrounding the edge faces of the base, and slotlike openings between the base and the cap allow opening means to enter said cassette and, depending on their depth of entering, to engage and thereby lift the cap only, or to engage both the cap and the removable PSL plate(s) thereby lifting the cap as well as the removable plate(s).

The removable plate(s) has (have) extensions which are arranged for engagement by the mentioned lifting means, and said extensions can be slotted to allow lips of said lifting means to form fittedly engage said slots in order to obtain an improved control of the position of such plate(s).

BRIEF DESCRIPTION OF THE DRAWINGS

The invention will be described hereinafter by way of example with reference to the accompanying drawings, wherein:

FIG. 3a is a diagrammatic lateral and FIGS. 3b and 3c are frontal views of one of four identic mechanisms for opening the cassette, FIG. 5a is a lateral and FIGS. 5b and 5c are frontal views of an opening mechanism in its cap-lifting position, FIG. 7a is a diagrammatic lateral and FIGS. 7b and 7c are frontal views of an opening mechanism in its PSL plate-lifting position.

DETAILED DESCRIPTION OF THE INVENTION

Figure 1:
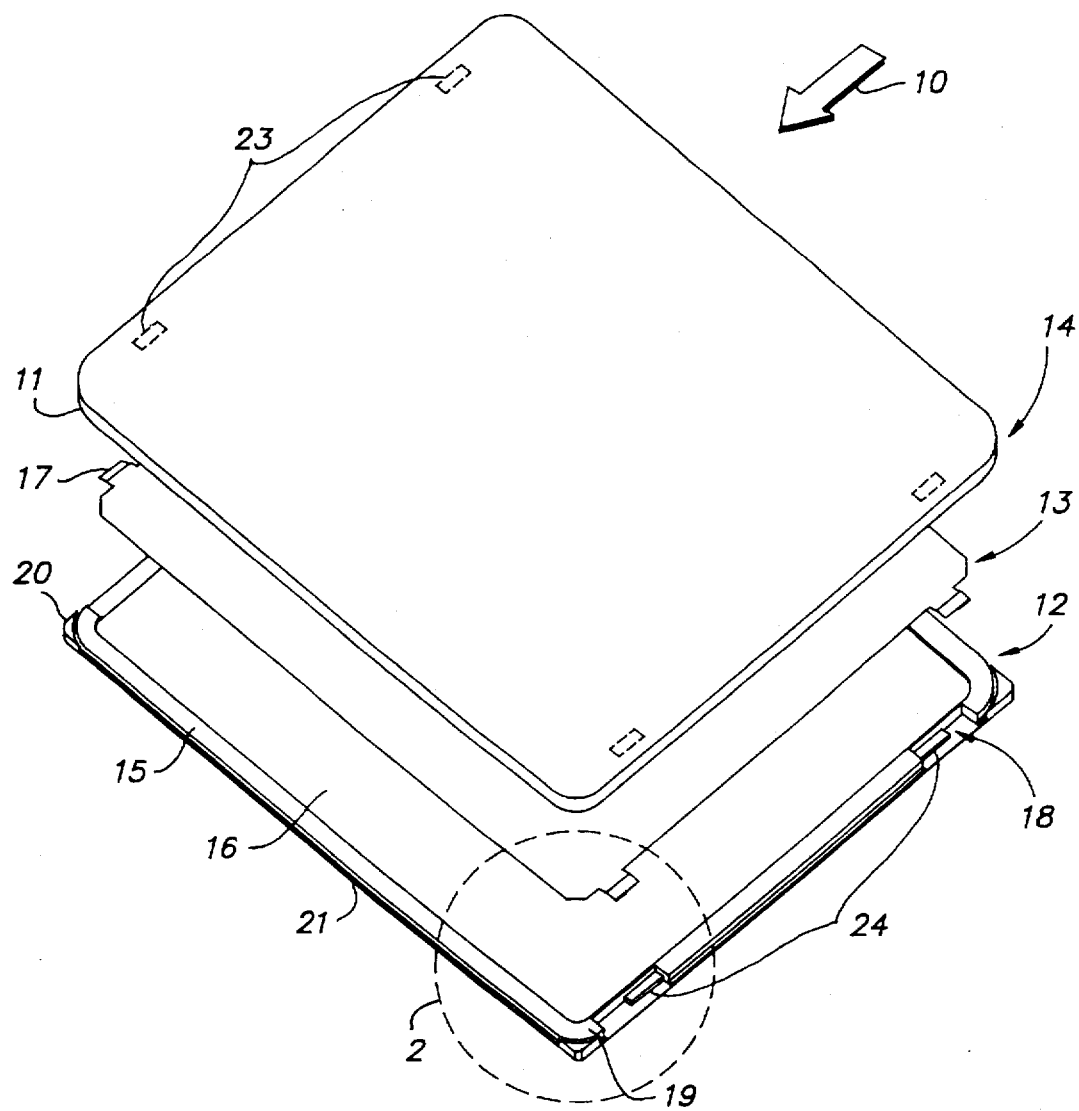
FIG. 1 is an exploded view showing one embodiment of a PSL cassette according to the present invention.

Referring to FIG. 1, one embodiment of a cassette 10 according to the invention is shown which comprises three distinct parts, viz. a base 12, a separate PSL-plate 13 and a cap 14.

The base has generally a rectangular shape and can be made from any suitable material, such as plastic, aluminium, a composite material and the like. In the present example, the cassette comprises a frame 15 within which is fitted a rectangular panel 16 which was composed of a honeycomb structure to which on both sides an aluminium plate was adhered by means of a suitable high-strength adhesive. The base thus obtained has a low weight and yet has a high dimensional stability.

PSL plate 13 has a size corresponding generally with that of panel 16 of the base. The plate has four extensions 17 which are angled downwardly to fit in corresponding openings 18 in the margins of the base. A suitable material for the plate is copper which in a thickness of approximately 0.8 mm offers a sufficient mechanical stiffness and also the desired absorption of the lower intensity range of the X-ray image. Both panel 16 and plate 13 are provided with a layer of PSL material either in the form of such a layer directly coated to or sprayed on the base and plate, or in the form of a foil of polyester or the like cut from a roll of web which has been coated with a PSL layer, and which foil is then adhered to the panel and the plate.

Cap 14 is in fact a flat plate having a peripheral wall (11) that telescopingly fits over the base to lighttightly close the cassette. The corners of the peripheral wall are rounded and fit in correspondingly curved grooves 19 of the base. Corner elements 20 are made in a resilient material and protect the cassette in case of mishandling, dropping, etc. Cap 14 does not overlap the base over its complete height, but seats on a peripheral heel 21 of the base which improves the light-tightness and also protects the cap from being accidentally lifted by contact of its free edge with some object. A suitable material for the construction of the cap is plastic, e.g. a sheet of black pigmented ABS shaped by thermo-forming.

The locking of the cap to the base in order to keep the cassette closed in use can be done in different ways. In the present embodiment, the cap and the base were provided with 4 pairs of co-operating patches comprising each a plurality of interengaging plastic elements of a nail-like shape that can be inter-engaged and disengaged thousands of times without getting damaged. Suchlike patches are sold under the trade mark Dual Lock, manufactured by 3M. In the drawing, the position of the patches 23 of the cap has been indicated in dashed lines whereas the co-operating patches of the base are indicated by numeral 24.

Figure 2:
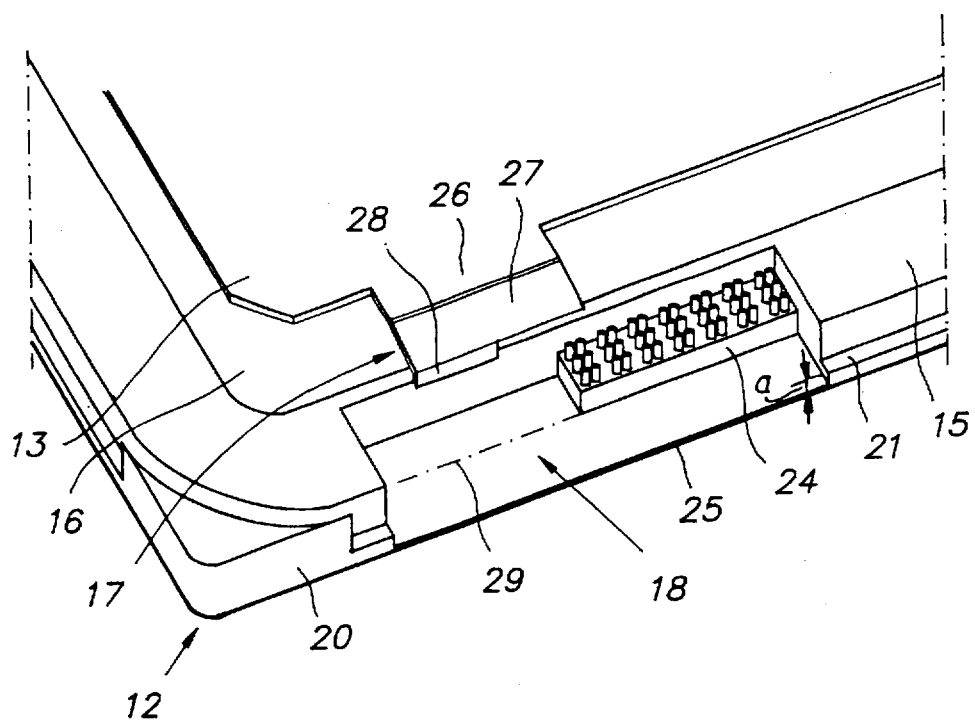
FIG. 2 is an enlarged detail 2 of the cassette according to FIG. 1.

FIG. 2 is an enlarged view of detail 2 of FIG. 1, cap 14 being not shown.

Opening 18 in base 12 is in fact a rectangular cut-out of frame 15, closed at the underside by bottom wall 25. Patch 24 occupies approximately half the width of the opening. The rigid extensions 17 of PSL plate 13 comprise three distinct portions, viz. 26 which lies in the plane of the plate, 27 which is angled over 45°, and a lip 28 which is vertical and the length of which is nearly half that of the rigid extension. The location of lip 28 in a horizontal plane is indicated by its downward projection on wall 25, viz. dot-and-dash line 29.

The opening and closing of a cassette and the reading-out of the two distinct X-ray images is described hereinafter with reference to FIGS. 3 to FIG. 8. The drawings show one embodiment only of a suitable cassette opening mechanism and it will be clear to those skilled in the art that other mechanical concepts can be devised for performing the desired functions.

Figure 4:
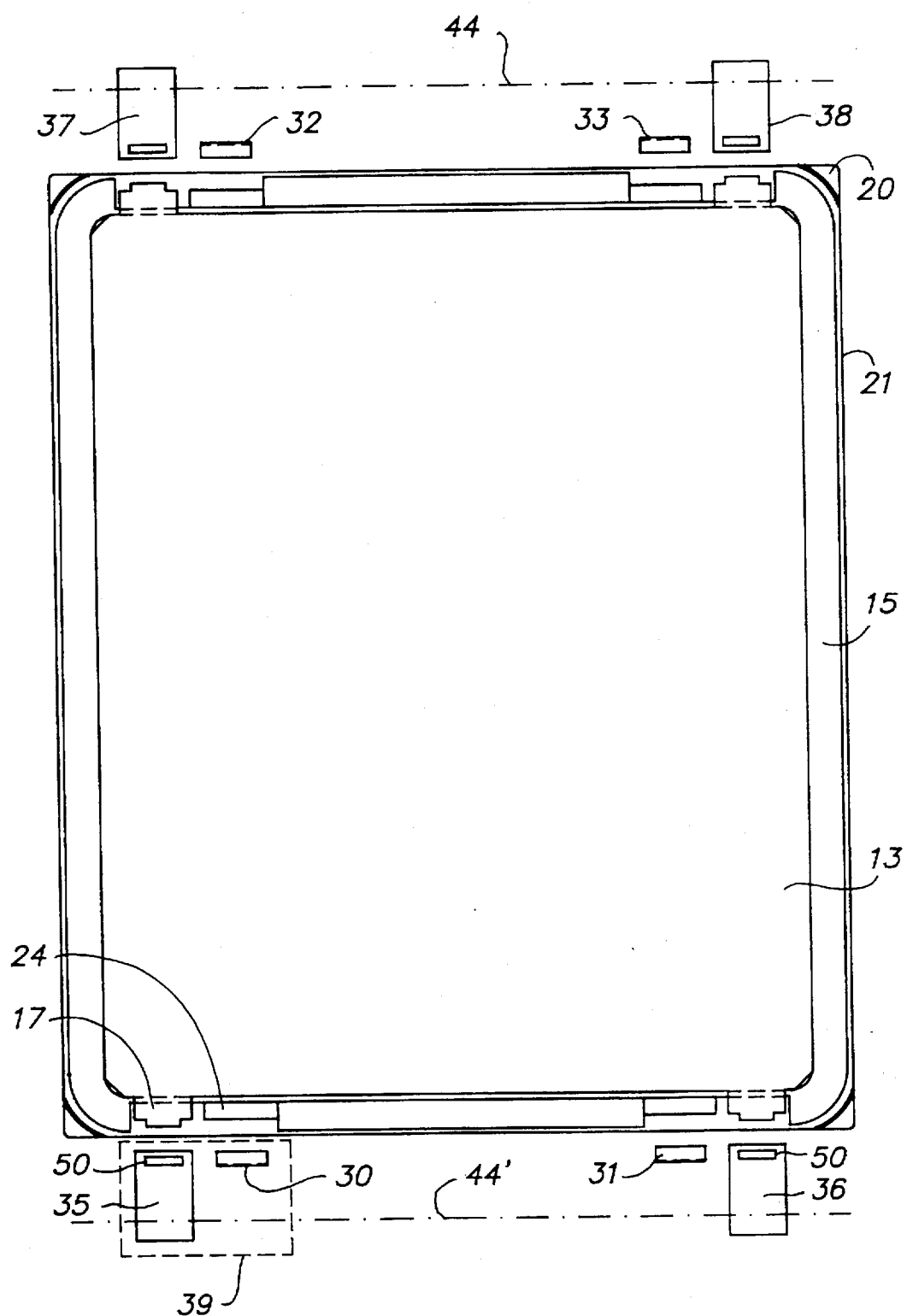
FIG. 4 is a plan view of the cassette, the opening mechanisms being inoperative.

FIG. 4 is a diagrammatic plan view of the cassette and of the opening mechanism which basically comprises four horizontally movable fingers 30 to 33 for gripping the base 25 of the cassette at a position in front of patches 24 in openings 18, and four fingers 35 to 38 that are movable horizontally as well as vertically for gripping and lifting the cap together with the PSL plate, or the cap only.

Each corresponding cap and base finger are fitted in a gripper assembly 39, only one being diagrammatically shown in FIG. 4. The four gripper assemblies are arranged on two parallel rows 44 and 44'. The two gripper assemblies of each row are axially displaceable and both rows are also displaceable towards and away from each other so that the four assemblies can fit different cassette formats.

One embodiment of a gripper assembly 39 including a base and a cap finger is now described with reference to FIGS. 3a and 3b.

A gripper assembly 39 comprises a base element 41 movable along a shaft 40 running parallel to a cassette edge and also displacable towards and away from the cassette, and a top element 42 connected with 41 via a pin 43 in a corresponding groove which allows vertical movement of element 42 with respect to 41, and also a horizontal displacement of element 42 as shown in FIG. 5c.

Finger 30 in the form of a leaf spring is fitted at its lower end to element 41. The finger has a slightly angled position as can be seen in FIG. 3b and its top end is deflected horizontally outward as visible most clearly in FIG. 7c. This top end is not visible in FIG. 3b since it coincides with finger 35 which is a straight leaf spring fitted in element 42.

The various means for controlling the positions and movements of the base and top elements have not been shown since they are not required for understanding the opening and closing operations that now will be described. They can comprise cables, chains, rotatable screw spindles and the like, all as known in the art.

Figure 6:
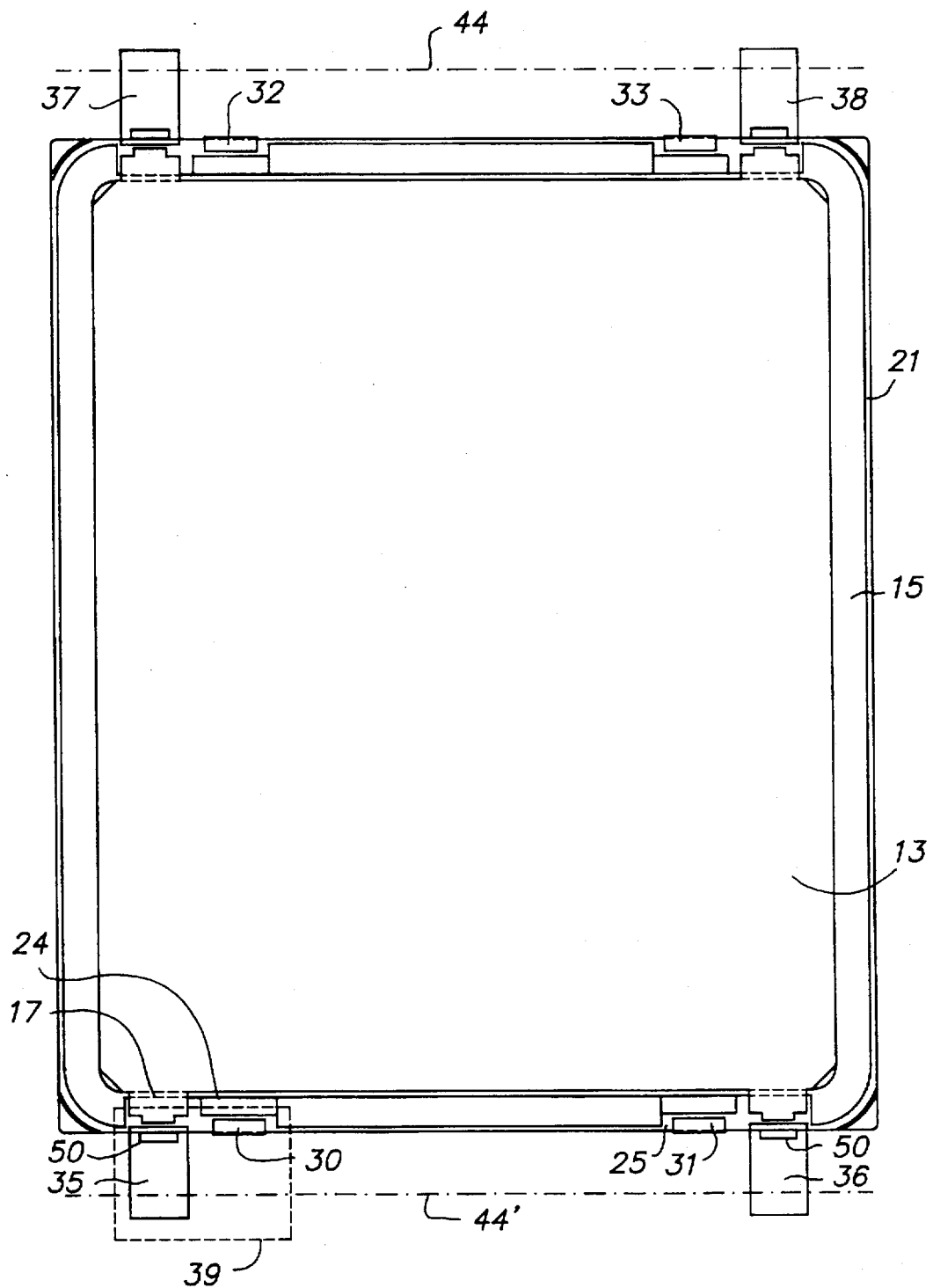
FIG. 6 is a plan view of the cassette, the opening mechanisms being in the cap-lifting position.
Figure 8:
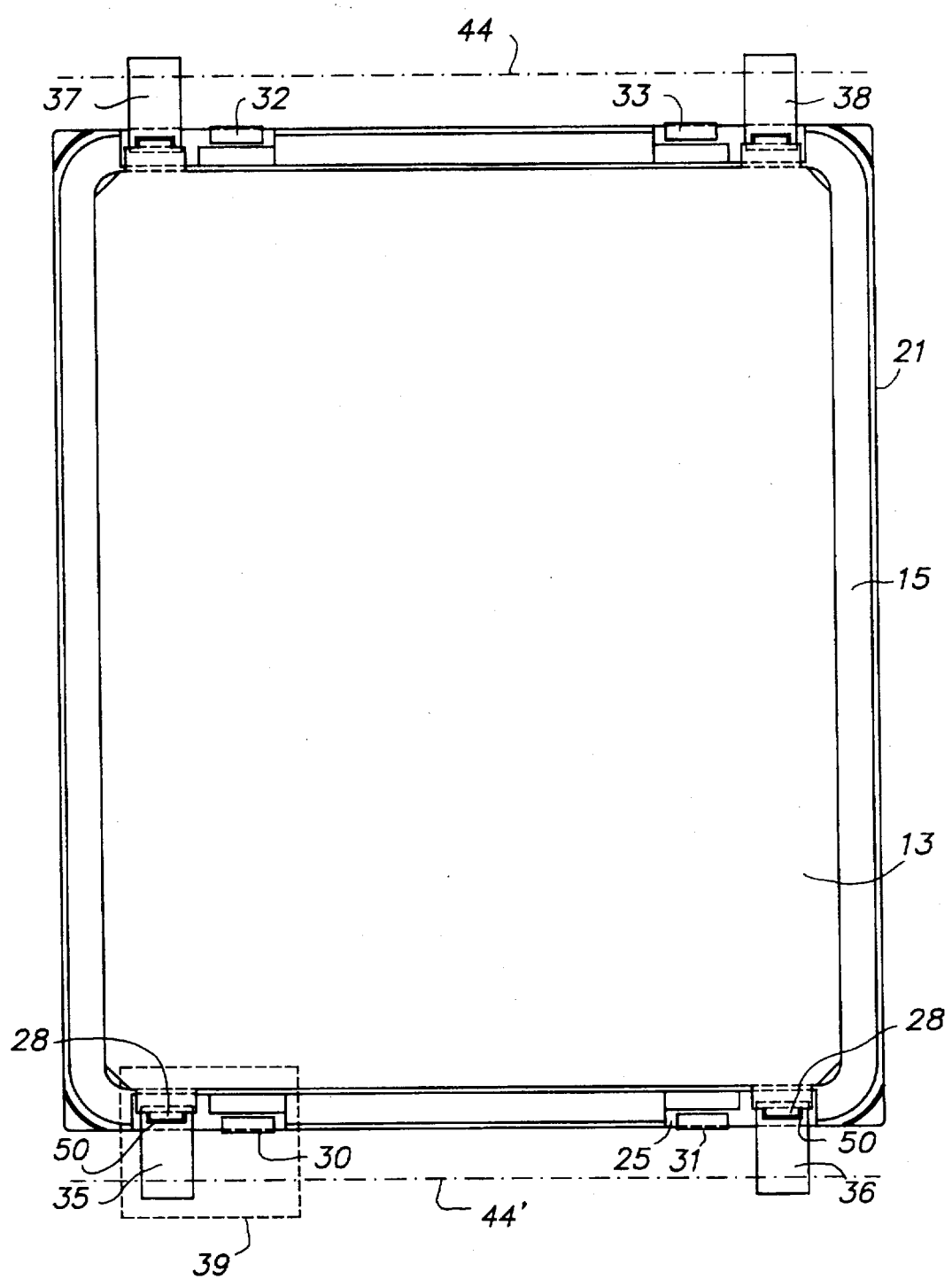
FIG. 8 is a plan view of the cassette, the opening mechanisms being in the PSL plate-lifting position.

Referring now to FIG. 6, there is shown a plan view of a cassette the cap of which has been omitted, similarly to FIG. 4, in order not to overload the drawing with dashed lines showing those elements normally covered by the cap.

The cassette is shown in the cap-lifting position, what means that fingers 30,31,32 and 33, and 35,36,37 and 38 have entered the corresponding openings 18 of the base, see FIG. 2, and this at a level situated within the height a which is the thickness of heel 21 of the base and which leaves a slot-like opening between the bottom edge of the cap and the heel, allowing access of these fingers. Fingers 30 to 33 engage with their angled end bottom wall 25 and are slightly bent rearwardly as mechanisms 39 are advanced still further so that also fingers 35 to 38 can enter the mentioned slots to engage the lower edge of cap 14, see FIG. 3c.

Elements 42 are then raised over some distance, say between 15 and 20 mm so that they take a position as shown in FIG. 5b, thereby lifting cap 14 from base 12.

Next, elements 41 are slightly withdrawn while elements 42 remain in place, see FIG. 5c, whereby base 12 is no longer gripped by fingers 30 to 33 and can be moved away for scanning and consecutively erasing PSL plate 13 resting on it. A suitable mechanism for the described movement of the base comprises an endless belt with a carrier, and we refer to our co-pending EP applications 95 201 481.7 and 95 201 482.7, filed 6 Jun. 1995 wherein a novel cassette dispensing and scanning mechanism has been described.

After the cassette base has been returned to its initial position, mechanisms 39 are moved again towards the cassette, but this time a few millimeters further than in the first position. Fingers 35 to 38 are now deeper in openings 18, and thereby they take a position under the extensions 17 of PSL plate 13, their slots 50 being located precisely under lips 28 of these extensions, see FIG. 8.

Elements 42 are raised, see FIG. 7b, and fingers 35 to 38 now lift cap 14 as well as PSL plate 13. The interlocking of lips 28 with openings 50 of the fingers ensures a good control of the lateral position of the PSL plate. Next, elements 41 are withdrawn while elements 42 remain immobile, see FIG. 7c, so that now base 12 is free again for being moved through the scanning station, thereby to scan and next erase its PSL layer. Then the base is returned to its initial position, fingers 30 re-engage the base, and finally the cap and the PSL plate are lowered on the base. Shoulder 51 of gripper elements 42 exerts pressure on the cap so that a firm interengagement of the locking patches of both base and cap is obtained.

The four gripping mechanisms 39 are withdrawn to their rest position, see FIG. 4, so that the cassette can be taken away and used for taking another image-wise exposure.

A cassette according to the present invention is not limited to the embodiment described hereinbefore.

Such cassette can comprise more than one separate PSL plate. Such other plate(s) can have the same X-ray absorption characteristics as the first plate, but different absorption characteristics, e.g. obtained through different thicknesses of the plates, are possible as well.

Such other plate(s) can be arranged for individual gripping by the plate lifting means. According to one embodiment the extensions of the different PSL plates can have different lengths so that by appropriate adjustment of the insertion depth of the lifting fingers, the desired plate(s) can be lifted for reading out the underlying one. Selection of an appropriate plate can also be based on extensions having different widths instead of different lengths, and thus gripping mechanisms such as 39 can be controlled to take different positions along axis 44,44' thereby to engage a particular series of extensions.

The invention includes also means, e.g. an electroluminiscent plate, located in a cassette according to the invention for erasing one image after a first image-wise exposure of the cassette with X-ray radiation of a first spectral composition. Next the cassette is image-wise exposed a second time with radiation having a spectral composition differing from the first one. Then the distinct cassette images are read out by manipulation of the cassette as described hereinbefore.

I claim:

1. A cassette for photo-stimulable ("PSL") radiography, comprising a flat rigid base (12) and a cap (14) for the base which is releasably securable thereto so as lighttightly to cover a layer of PSL material applied on a surface of the base, characterised in that said cassette comprises at least one rigid removable PSL plate (13) which can freely rest on said base within said cap, and which is arranged for absorbing a portion of an X-ray radiation image which will expose the PSL layer on the base, said cap (14) and said at least one removable plate (13) being arranged in such a way that both the cap alone, and the cap together with said at least one removable PSL plate can be lifted from the base, in order to allow the separate reading-out of the images of the base and of the at least one removable PSL plate.

2. A cassette according to claim 1, wherein said cap (14) has a peripheral flange (11) which telescopingly fits over said base, and wherein slotlike openings (18) are provided between the base and a lower edge of the cap allowing entry of means for lifting the cap from the base.

3. A cassette according to claim 2, wherein said openings (18) are sufficiently wide to allow entry of the means for lifting the cap from the base, as well as entry of means for holding back the base during such lifting of the cap.

4. A cassette according to claim 2, wherein said openings (18) are sufficiently deep to allow entry of said cap-lifting means over a first depth thereby engaging the cap only, and over a second, larger depth thereby engaging and lifting the cap as well as the at least one removable plate.

5. A cassette according to claim 2, wherein said openings (18) are provided in two opposed margins of said base.

6. A cassette according to claim 5, which is rectangular, said openings being provided in the two smaller lengths of said base.

7. A cassette according to claim 2, wherein said at least one PSL plate (13) has extensions (17) which are arranged for engagement by said lifting means.

8. A cassette according to claim 7, wherein said extensions have lips (28) that are engaged by slotted lifting means (50).

9. A cassette according to claim 2, wherein said lifting means are steel leaves.

10. A cassette according to claim 2, which has an uninterrupted peripheral heel (21) covering the free edge of the flange (11) of said cap (14).

11. A cassette according to claim 1, which comprises one removable PSL plate (13).

* * * * *